Oct. 27, 1925.
J. V. SKOGLUND
1,559,292
METHOD OF MANUFACTURING SULPHURIC ACID
Filed March 25, 1924
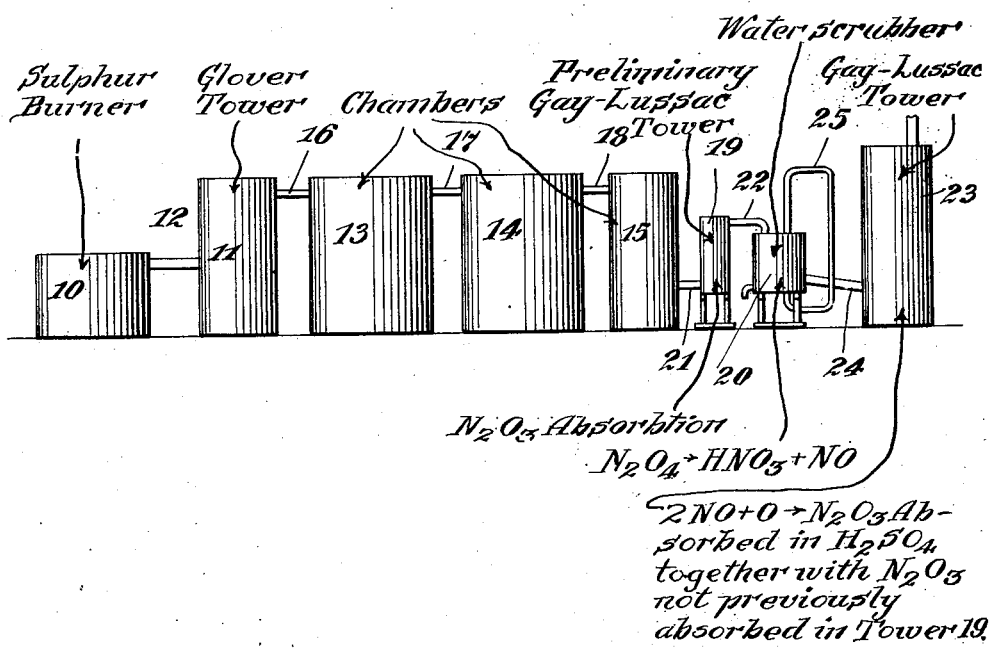
Inventor
Jean V. Skoglund
By his Attorneys Patented Oct. 27, 1925.

1,559,292

UNITED STATES PATENT OFFICE.

JEAN V. SKOGLUND, OF NEW YORK, N. Y.

METHOD OF MANUFACTURING SULPHURIC ACID.

Application filed March 25, 1924. Serial No. 701,839.

*To all whom it may concern:*

Be it known that I, JEAN V. SKOGLUND, a citizen of the United States, residing in the borough of Manhattan, city, county, and State of New York, have invented an Improvement in the Method of Manufacturing Sulphuric Acid, of which the following is a specification.

My present invention relates to a method of manufacturing sulphuric acid by the so-called chamber process, the object of which is the recovery of the nitrous vapors employed in this process, a large proportion of which has heretofore escaped through the exit stack.

The chamber process of manufacturing sulphuric acid consists briefly in the production of sulphur dioxide which is mixed with air, nitrous gases and water or water vapors and the mixture introduced into large lead chambers, towers, pipes or other receptacles or a combination of such receptacles to cause the formation of sulphuric acid as practiced in carrying out this process. The nitrous gases are recovered in a Gay Lussac tower through which sulphuric acid is passed in the usual manner in order to use these gases over again in the process carried out in accordance with established practice. In this process, however, there is always a loss of nitrous gases which escape the recovery process and pass out through the stack to the atmosphere in the form of nitrogen peroxide or nitric oxide. The nitric oxide is practically insoluble in strong sulphuric acid and the nitrogen peroxide is taken up very slowly with the formation of nitrosyl-sulphuric acid and nitric acid, the greater part of which escapes on account of its vapor tension, depending of course on the temperature of the absorbing process. As is known, nitrogen trioxide combines directly with sulphuric acid and is absorbed quickly thereby, the nitrogen trioxide therefore forming no loss in a properly constructed and operated plant. It naturally follows from the foregoing that in order to recover all the nitrous gases or all the nitre and to manufacture sulphuric acid in the most economical manner the process should be so carried out that the gases entering the Gay Lussac tower include only nitrogen trioxide. Notwithstanding the fact that this theory is obvious the chemical reaction is not thoroughly understood, but nevertheless it is to a large extent unconsciously followed in common practice by permitting or causing the chamber process to be finished as close as possible to the end of the last chamber of the apparatus. If the process is finished before there is time for nitrogen trioxide to oxidize to nitrogen peroxide in which form the nitrous gases are only very slowly absorbed by sulphuric acid, heavy red vapors issue from the exit pipe and stack is oftentimes observed at sulphuric acid works. On the other hand if the process is not finished before the gases enter the tower sulphur dioxide will enter the Gay Lussac tower and cause a very poor absorption for well known reasons.

I am aware that heretofore it has been proposed to introduce sulphur dioxide gases in the last chamber near the Gay Lussac tower in order to reduce the nitrogen peroxide present to nitrogen trioxide, but this process has not been successful in commercial operation. It amounts to finishing the process at the proper time but as the various reactions are not instantaneous but extend over a considerable period it has been found difficult to determine just how much and when to introduce the sulphurous gases in order to obtain the desired effect. The reaction between the dilute sulphurous gases and the nitrous gases is naturally slow. There is only a few tenths of one per cent of nitrous gases present and a few hundredths of one per cent of nitrogen peroxide present in a properly conducted process. The oxidation of nitrogen trioxide to nitrogen peroxide in air is relatively rapid as only a few moments are required for a comparatively complete reaction, whereas the oxidation of nitric oxide to nitrogen trioxide under substantially the same conditions takes place in about one-fifth the time. Owing to the dilution of the gases in the chamber process all forms of nitrogenous gases may be present at the same time as my research work has shown to be the case.

In the commercial production of sulphuric acid by the chamber process it is considered advisable to have a certain amount of red fumes issuing from the stack because under these conditions the operator knows that the temperature in the different phases of the process is correct and that he is obtaining good results. When no light red fumes issue from the stack the conditions are usually such that there is a relatively high consumption of nitre employed. However, in a well conducted plant there is always a certain loss of nitre in the form of nitrogen peroxide at the stack and as the process is usually finished near the end of the last chamber or at the bottom or entrance to the Gay Lussac tower any disturbing agents upset the process and result in a further loss of nitre with or without a loss of sulphur dioxide. If the atmospheric temperature falls or there is a draft on the chamber walls the chamber process will be prematurely finished and the red fumes escape in relatively large quantities. On the contrary in hot weather, for example, the process is retarded and sulphur dioxide enters the Gay Lussac tower causing a considerable loss of nitre. It naturally follows, therefore, that the operator must be acquainted with actual conditions at all times in order to obtain the best results, but even in the best practice and with the utmost care there is always a loss of two to three per cent of nitre figured relatively to the sulphur and often this loss of nitre is considerably greater than from two to three per cent. Obviously also there are times when the process may be run with a smaller loss of nitre, particularly under the most favorable weather conditions, but such runs are exceedingly exceptional. They tend to show, however, that the loss of nitre is through the exit pipe or stack and not by the chemical reaction of the nitrous gases to nitrous oxide or even to nitrogen which has been suggested to explain the consumption of the nitre. From the foregoing, it will be understood that an ideal operation for the production of sulphuric acid by the chamber process is one in which the process is finished slightly ahead of time and in which all the nitre or nitrous vapors are recovered. Such a process would not only be economical as to the nitre and sulphurous gases, but obviously would require comparatively little attention in the operation of the same. Furthermore, if the chamber should show a tendency to become upset the attendant need have no hesitancy in adding an extra supply of nitre because this would be recovered and would be employed over again, and furthermore by the use of a more or less generous supply of nitre a greater yield of sulphuric acid is obtained.

My present method of manufacturing sulphuric acid consists in completely absorbing the nitrous gases and while relatively simple depends upon the fact that nitrogen peroxide is easily decomposed by water or weak acids forming nitric acid and nitrous acid which latter, that is the nitrous acid is further decomposed more or less completely into nitric acid and nitric oxide. The nitric oxide is oxidized comparatively quickly to nitrogen trioxide which subsequently is absorbed by sulphuric acid in the usual manner. It will be understood that sufficient time must be allowed for the oxidation of the nitric oxide by an excess of the air, as in usual practice in the chamber process, and this is carried out to the best advantage in the presence of sulphuric acid as in a Gay Lussac tower. Otherwise some of the nitric oxide may be again oxidized to nitrogen peroxide and thus not be absorbed. As hereinbefore stated the absorption of the nitrogen trioxide in the sulphuric acid is substantially complete.

I have also found that by treating or scrubbing the gases with water as they come directly from the chambers the reactions hereinbefore described take place, but as the nitrous gases consist largely of nitrogen trioxide a great portion of the same is decomposed into nitric acid and nitric oxide which naturally make the final gases rich in nitric oxide and consequently require more time and larger towers for sufficiently good absorption. Furthermore this would also require more water in the treatment and this may be objectionable in a Glover tower. There may also be other objections in that the heat in the reaction apparatus will be relatively high and may have a detrimental effect on the material of which such an apparatus may be constructed, although the gases may be cooled in any convenient way. Notwithstanding the foregoing, however, the process of absorbing nitrous gases may be carried out as hereinbefore described.

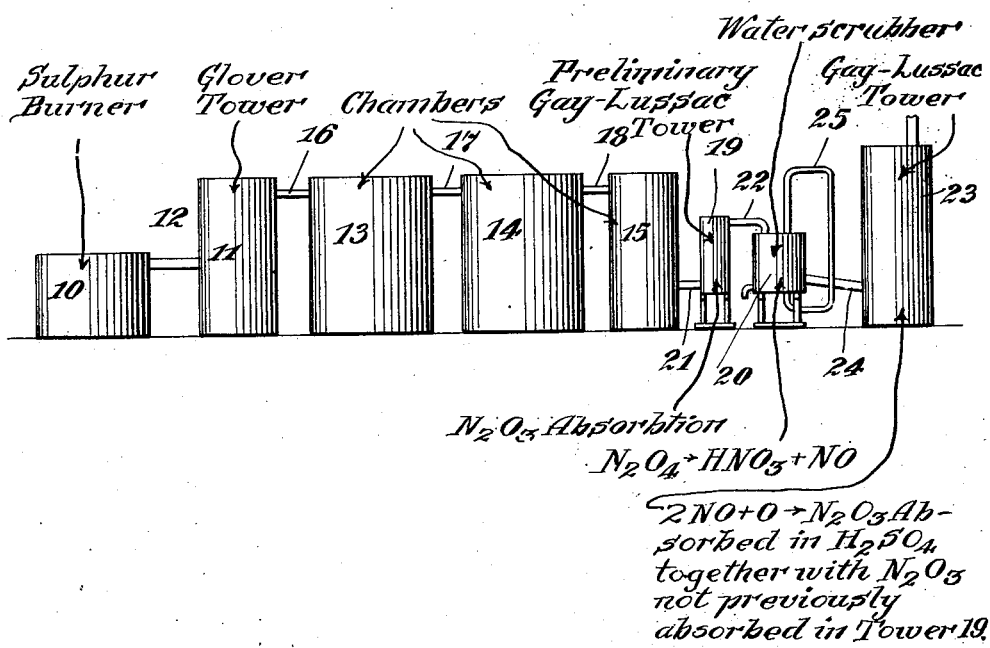

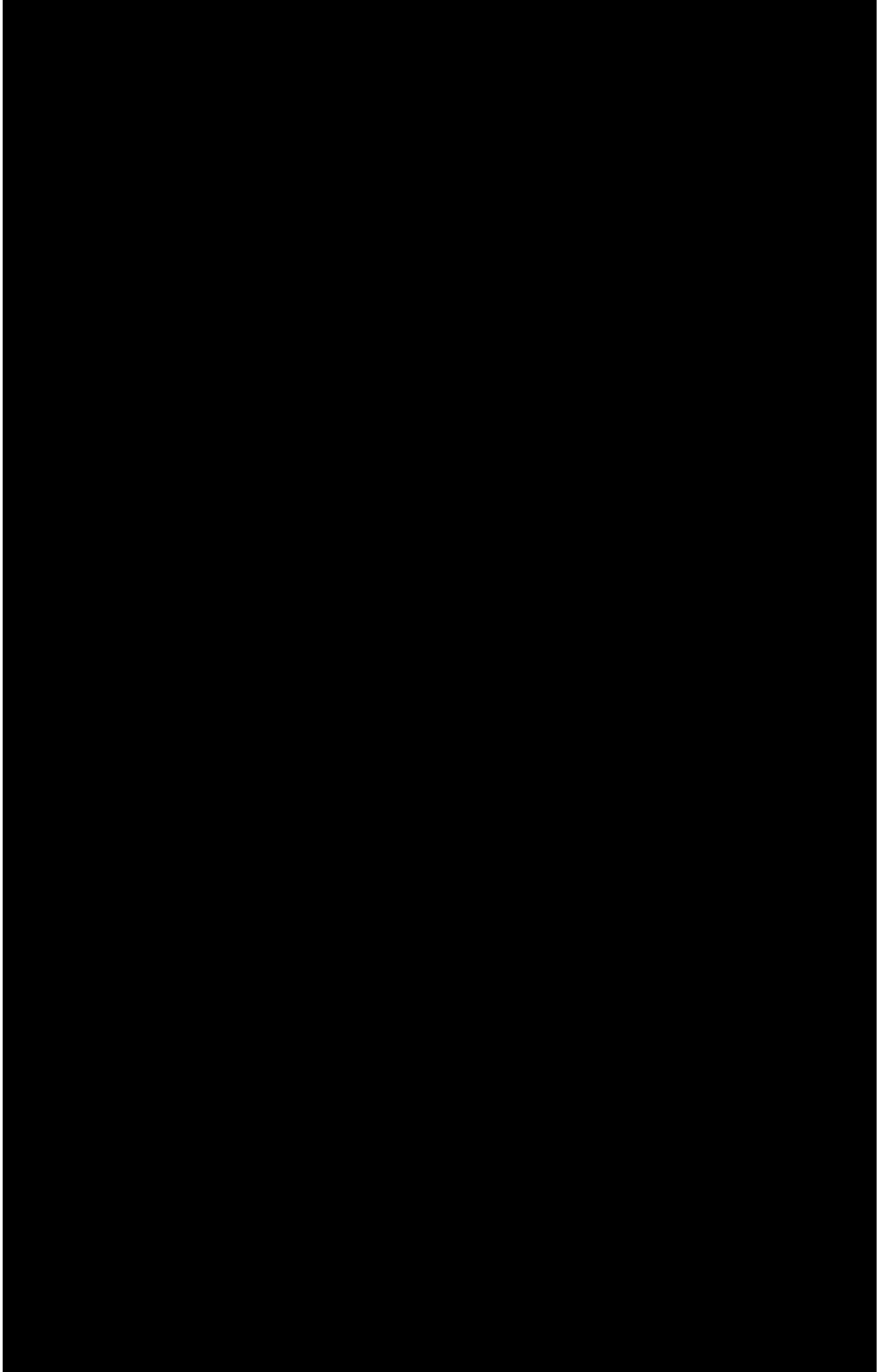

In the preferred practice of my invention, however, I pass the gases, that is the gases as they come from the chambers through a preliminary Gay Lussac tower which may be of a relatively small size but in which, owing to the concentration of the gases, a great proportion of the nitrogen trioxide present is absorbed by the sulphuric acid. Then the resultant gases containing a relatively large amount of nitrogen peroxide and a relatively small amount of nitrogen trioxide are passed to a relatively small tower and treated therein with water or a weak acid solution, as hereinbefore described in the other manner of carrying out the invention. This scrubbing tower may be of relatively small dimensions with but a few feet of scrubbing material. The gases may be treated with any suitable spraying device instead of passing them through a scrubbing tower. Then the residual gases are passed to and absorbed by the sulphuric acid in the main Gay Lussac tower, the size of which, as will be understood, may be smaller than would otherwise be necessary on account of the composition of the gases. It will be understood that ample space must be provided for the oxidation of the nitric